United States Patent Office 3,288,854
Patented Nov. 29, 1966

3,288,854
ADDITION OF DIALKYLKETENES TO ALKOXYACETYLENES
James C. Martin, Kingsport, Tenn., assignor to Eastman Kodak Company, Rochester, N.Y., a corporation of New Jersey
No Drawing. Filed July 5, 1963, Ser. No. 293,203
6 Claims. (Cl. 260—586)

This application is a continuation-in-part of my earlier copending application Serial No. 205,197 filed June 26, 1962.

This invention relates to novel chemical compounds and to a novel method of preparation and more particularly to novel 3-alkoxy-4,4-dialkyl-2-cyclobuten-1-ones and derivatives thereof and to their preparation by cycloaddition of dialkylketenes to alkoxyacetylenes.

The novel 3-alkoxy-4,4-dialkyl-2-cyclobuten-1-ones of the invention and their method of preparation can be represented by the following equation:

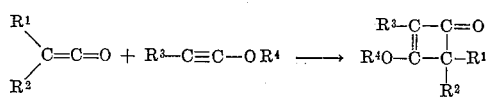

In the above equation $R^1$ and $R^2$ are the same or different alkyl radicals or are alkylene radicals that form a saturated carbocyclic ring with the carbon atom to which they are attached. Preferably, $R^1$ and $R^2$ have from 1 to 8 carbon atoms. Most preferably, $R^1$ and $R^2$ are lower alkyl or lower alkylene radicals having, e.g., from 1 to about 4 carbon atoms. $R^3$ can be hydrogen or a lower alkyl radical and $R^4$ is lower alkyl radical.

The formation of the ring system, 3-alkoxy-2-cyclobuten-1-one, by the cycloaddition of diphenylketene with alkoxyacetylenes has been described in papers by J. F. Arens and co-workers. For example, Rec. trav. chim., 77, 761 (1958) disclosed the cycloaddition of diphenylketene to 1-ethoxy-1-propyne to obtain a 4,4-diphenyl cyclobutenone (I):

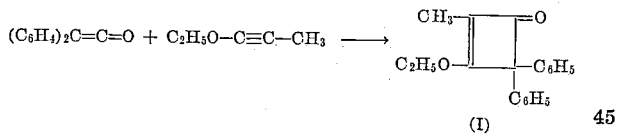

Other publications in addition to the above references have suggested or disclosed cyclobutenone derivatives of monoalkylketenes and alkoxyacetylenes, e.g., Arens et al., Rec. trav. chim., 80, 810 (1961); Woodward, J. Am. Chem. Soc., 72, 1297 (1950); and Enk et al., Ang. Chem., 73, 334 (1961). However, to the best of our knowledge the cycloaddition of dialkylketenes with alkoxyacetylenes and the novel 3-alkoxy-4,4-dialkyl-2-cyclobuten-1-one products have not heretofore been suggested. The present invention is based on our discovery of the synthesis of these novel dialkylketene derivatives that have unexpected advantages over the prior art compounds.

One important advantage of our dialkylketene derivatives resides in their thermal stability. The diphenyl substituted cyclobutenone (I) and other cycloaddition products of diphenylketene and alkoxyacetylenes are converted by gentle heating to a substituted naphthol (Nieuwenhuis and Arens, Rec. trav. chim., 77, 1153 [1958]):

(I)

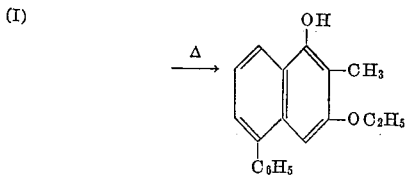

Unlike these diphenylketene adducts, the dialkylketene adducts of the present invention are stable at temperatures, e.g., up to 150° C. and do not form the substituted naphthols. The compounds of the invention are useful chemical intermediates, for example, in the preparation of cyanine dyes useful as photographic spectral sensitizers and esters useful as plasticizers for synthetic resins and in the preparation of compounds having pharmaceutical activity. Compounds of the invention are also useful directly as plasticizers. In their use as chemical reagents or intermediates the thermal stability of the new compound is a valuable attribute because it eliminates by-product naphthol formation.

Another advantage of the method of the invention and of the novel compounds obtained is that they provide means for the preparation of useful and heretofore unknown mixed cyclobutane dimers of ketene and dialkylketenes and of monoalkylketenes and dialkylketenes. Thus, the hydrolysis of the compounds of the invention in an acidic medium produces the enolic form of the mixed ketene dimers:

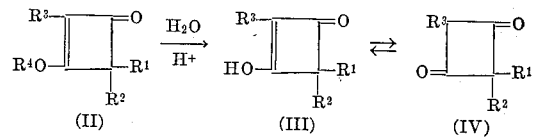

The hydrolysis product will contain equilibrium concentrations of the enol (III) and keto (IV) forms. The use of a highly polar solvent such as dimethylformamide or dimethylsulfoxide shifts the equilibrium toward a high concentration of the enol form. Solvents of lower polarity, e.g., chloroform, favor the keto form.

Much prior work has been done on certain ketene dimers but the mixed dimers of the present invention apparently have not previously been made and no method for their synthesis has been available. The ketene dimers of the prior art are of the types:

(a) monoalkylketene dimer,

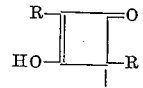

(b) mixed monoalkylketene dimer,

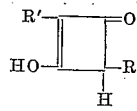

(c) dialkylketene dimer,

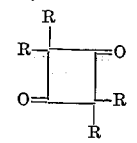

and (d) mixed dialkylketene dimer,

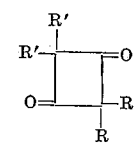

In contrast, the present invention makes possible the production of the following types of novel mixed dimers of ketenes:

(a) mixed dimer of ketene and a dialkylketene,

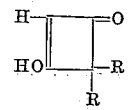

and (b) mixed dimer of monoalkylketene and a dialkylketene,

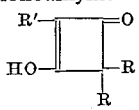

The preparation of alkoxycyclobutenones in accordance with the invention can be accomplished by mixing the dialkylketene with the alkoxyacetylene, with or without a solvent. Suitable solvents include both polar and non-polar solvents such as aliphatic or aromatic hydrocarbons, ethers, chlorinated hydrocarbons, esters and nitriles. Suitable reaction temperatures are in the range of about 0 to 150° C. Higher temperatures within this range are preferably employed for the less reactive ketenes. For reasons of economy the reactants are preferably used in the molar ratio of 1:1 but other ratios can be used if desired.

The dialkylketenes used in the method of the invention are of the type, $R^1R^2C=C=O$, wherein $R^1$ and $R^2$ are alkyl groups, as previously mentioned. It will be understood that for convenience, we use the term "dialkylketene" in its broad sense to include those compounds in which $R^1$ and $R^2$ are alkylene radicals that form a ring with the carbon to which they are attached. Examples of suitable dialkylketenes include: dimethylketene, ethylmethylketene, methylpropylketene, butylethylketene, diethylketene, pentamethyleneketene, hexamethyleneketene, ethylisobutylketene and the like.

The alkoxyacetylenes used in the method of the invention are of the type, $R^3$—C≡C—$OR^4$, wherein $R^3$ and $R^4$ are as previously indicated. Suitable alkoxyacetylenes have been described by Arens in "Advances in Organic Chemistry," R. A. Raphael et al., editors; Interscience Publishers, Inc., New York, New York, 1960, pages 127–129. Typical examples include: ethoxyacetylene, methoxyacetylene, 1-ethoxypropyne, 1-ethoxy-1-heptyne and the like.

The following examples illustrate the preparation of novel compounds in accordance with the invention.

EXAMPLE 1

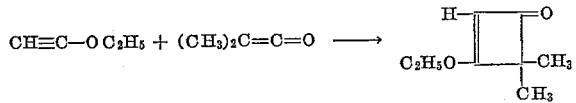

To a stirred solution of 98 g. (1.4 moles) of ethoxyacetylene in 300 ml. of hexane was added 98 g. (1.4 moles) of dimethylketene. The reaction was slowly exothermic, and an ice bath was used to keep the temperature below 40° C. After stirring for 5 hours, the solution was distilled through a 12-inch packed column to give 111 g. (57%) of 3-ethoxy-4,4-dimethyl-2-cyclobuten-1-one, B.P. 62–63° (2.5 mm.), $n_D^{20}$ 1.4583.

*Anal.*—Calcd. for $C_8H_{12}O_2$: C, 68.5; H. 8.6. Found: C, 68.6; H, 8.5.

Significant infrared maxima at 5.7µ (s) and 6.3µ (s). The nuclear magnetic resonance spectrum was in complete agreement with the structure assigned.

EXAMPLE 2

Using the same general procedure as Example 1, 98 g. (1.4 moles) of ethoxyacetylene, 250 ml. of acetonitrile and 98 g. (1.4 moles) of dimethylketene gave 137 g. (70%) of 3-ethoxy-4,4-dimethyl-2-cyclobuten-1-one.

EXAMPLE 3

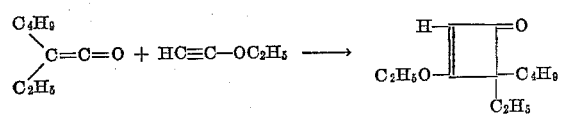

To a stirred solution of 51 g. (0.73 mole) of ethoxyacetylene in 150 ml. of hexane at room temperature was added 92 g. (0.73 mole) of butylethylketene. Stirring was continued for 6 hours at room temperature, then the solution was refluxed for 12 hours. Distillation through a 10-inch Vigreux column gave 73 g. (51%) of 2-butyl-3-ethoxy-2-ethyl-3-cyclobuten-1-one, B.P. 88° (0.8 mm.), $n_D^{20}$ 1.4665. Also unreacted butylethylketene and unidentified material boiling at 129–132° (0.6 mm.) were obtained.

Production of a novel ketene dimer is illustrated by the next example.

EXAMPLE 4

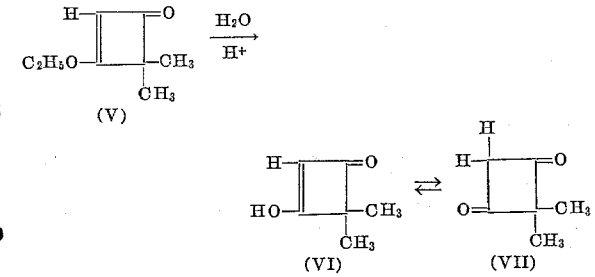

3-ethoxy-4,4-dimethyl-2-cyclobuten-1-one (V), as produced in Example 1, was subjected to hydrolysis in 5% hydrochloric acid solution at room temperature, giving a 76% yield of 3-hydroxy-4,4-dimethyl-2-cyclobutenone (VI), M.P. 131–132° C.

*Anal.*—Calcd. for $C_6H_8O_2$: C, 64.3; H, 7.2. Found: C, 64.1; H, 7.0.

The infrared spectrum (KBr pellet) showed two broad bands centered at 4.22 and 5.31µ, a sharp band at 5.88µ, and broad multiple bands centered at 6.6 to 7.5µ. The N.M.R. spectrum of a 20% solution in dimethylformamide was in agreement with the structure (VI).

The product (VI) of Example 3 is the enolic form of the mixed dimer of ketene and dimethylketene, the first known cyclobutane-type dimer (VII) involving ketene. It is a relatively strong acid ($pK_a$ 2.6). It and the other mixed dimers of ketenes of the present invention are valuable chemical reagents. They can be employed for a number of types of reactions for which known dimers of ketenes have been used. They offer the advantage of producing reaction products of which the number and/or positions of the alkyl substituents differ from those of the products of the known dimers of ketenes. As a consequence a method is now provided for preparing products not previously obtainable or that were heretofore produced only by more difficult methods.

EXAMPLE 5

Under the general conditions of Example 2, the following ketenes and alkoxyacetylenes give the products shown:

| Ketene | Alkoxyacetylene | Product |
|---|---|---|
| ⬡=C=O | HC≡COC₂H₅ | (cyclobutenone with C₂H₅O and cyclohexyl) |
| $(C_8H_{17})_2C=C=O$ | HC≡COC₂H₅ | (cyclobutenone with C₂H₅O and (C₈H₁₇)₂) |
| $(CH_3)_2C=C=O$ | $CH_3C≡COCH_3$ | (cyclobutenone with CH₃, CH₃O, (CH₃)₂) |
| $(CH_3)_2C=C=O$ | $HC≡COC_4H_9$ | (cyclobutenone with C₄H₉O and (CH₃)₂) |
| $(C_2H_5)_2C=C=O$ | $C_4H_9C≡COC_2H_5$ | (cyclobutenone with C₄H₉, C₂H₅O, (C₂H₅)₂) |

The novel alkoxycyclobutenones can be converted to useful alkoxycyclobutanols by catalytic hydrogenation over a supported ruthenium catalyst at elevated pressure. The following example illustrates this.

EXAMPLE 6

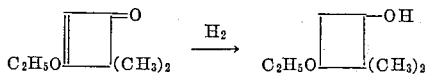

A solution of 10 g. of 3-ethoxy-4,4-dimethyl-2-cyclobuten-1-one in 75 ml. of cyclohexane was hydrogenated in an autoclave over 4 g. of 5% ruthenium on carbon catalyst at 50° and 1500 p.s.i. for 4 hr. The catalyst was removed by filtration and the filtrate was evaporated to give 9.6 g. of residue. Vapor phase chromatography indicated that this residue was one component. The infrared spectrum was identical to that of 2,2-dimethyl-3-ethoxycyclobutanol, B.P. 96–97° C. at 2 mm., prepared by another procedure.

The alkoxycyclobutanols as prepared in Example 6 are useful as intermediates in the preparation of esters of various carboxylic acids, e.g., diesters of dicarboxylic acids such as adipic, azelaic or sebacic acids, which are useful as plasticizers for synthetic resins such as poly (vinyl chloride) or cellulose acetate butyrate. The next example illustrates preparation of such a diester.

EXAMPLE 7

A mixture of 100 g. of 2,2-dimethyl-3-ethoxycyclobutanol, 200 ml. of benzene, and 80 g. of pyridine was placed in a flask which was equipped with a stirrer, reflux condenser, and dropping funnel, and 65 g. of adipyl chloride was added slowly. The mixture was stirred three hours and filtered. The solid (pyridine hydrochloride) was washed with benzene; the combined filtrates were washed with water, stripped of solvent, and distilled in a cyclic falling film molecular still to give 63 g. of bis(2,2-dimethyl-3-ethoxycyclobutyl)adipate, B.P. 82–94° (25μ), $n_D^{20}$ 1.4568–1.4570.

*Anal.* — Calcd. for $C_{22}H_{36}O_3$: Sapon. equiv., 198. Found: Sapon. equiv., 195.

The following example illustrates that the hydroxycyclobutenones of my invention can be present as the enol or keto form depending on the solvent in which they are dissolved.

EXAMPLE 8

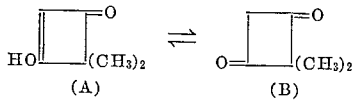

The infrared spectrum (KBr pellet) of 3-hydroxy-4,4-dimethyl-2-cyclobuten-1-one (prepared according to Example 4) showed two broad bands centered at 4.22 and 5.31μ, a sharp band at 5.88μ, and broad multiple bands at 6.6 to 7.5μ. These bands are indicative of the enol form (A). The infrared spectrum of a solution of this material in chloroform showed none of the bands mentioned above, but a new sharp band at 5.70μ. This spectrum is consistent with keto form (B). The N.M.R. spectrum of a 20% solution of the compound in dimethylformamide showed single peaks at −492 c.p.s. (enolic —OH), −182 c.p.s. (C=CH) and −49 c.p.s. [C(CH₃)₂]. These data are indicative of the enol form (A), but the N.M.R spectrum of its chloroform solution showed only single peaks at −155 c.p.s. $CH_2$ and −57 c.p.s. [O(CH₃)₂] indicating the keto form (B).

The N.M.R. spectra were determined at 40 mc. and peak positions are reported in cycles per second relative to tetramethylsilane as an internal standard.

EXAMPLE 9

Under the general conditions of Example 4, the following alkoxycyclobutenones give the products shown. Although these products are shown in the enol form, it is understood that they are convertible into the keto form.

| Alkoxycyclobutenone | Product |
|---|---|
| $C_2H_5O$—cyclobutenone with cyclohexyl | $HO$—cyclobutenone with cyclohexyl |
| $CH_3$, $CH_3O$—cyclobutenone—$(CH_3)_2$ | $CH_3$, $HO$—cyclobutenone—$(CH_3)_2$ |
| $C_2H_5O$—cyclobutenone—$C_4H_9$, $C_2H_5$ | $HO$—cyclobutenone—$C_4H_9$, $C_2H_5$ |
| $C_4H_9O$—cyclobutenone—$(CH_3)_2$ | $HO$—cyclobutenone—$(CH_3)_2$ |

The keto forms of the novel hydroxycyclobutenones which have a methylene group (—CH₂—) in the four-membered ring have another valuable utility. Because of the active methylene group between the two carbonyl groups these compounds can be used to prepare cyanine dyes useful as spectral sensitizers for photographic silver halide emulsions. The procedure comprises condensing the keto form of the novel compound of the formula,

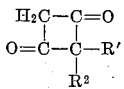

with one of the well-known "I.C.I. intermediates" such as 2-β-acetanilidovinyl-3-ethylbenzoxazolium iodide, which are disclosed, e.g., in British Patent No. 344,409 and U.S. Patent No. 2,870,014.

The reaction is carried out by heating the reactants, e.g., in equimolar proportions, in the presence of a basic condensing agent, e.g., triethylamine, and an inert diluent such as ethanol, propanol, 1,4-dioxane, etc. Temperatures from ambient temperature to the reflux temperature of the reaction mixture can be used. The resulting dye is recovered by filtration and recrystallization. Suitable procedures are disclosed in U.S. 2,870,014 which also discloses well-known procedures by which the cyanine dyes formed from the compounds of the invention can be incorporated in photographic silver halide emulsions as spectral sensitizers.

The preparation of such a cyanine dye from a compound of the invention is illustrated by the following example.

EXAMPLE 10

4-[(3-ethyl-2-benzoxazolinylidene)ethylidene] - 2,2 - dimethyl-1,3-cyclobutanedione

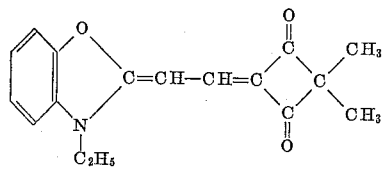

2,2-dimethyl-1,3-cyclobutanedione (0.56 g., 1 mol.) and 2 - β - acetanilidovinyl-3-ethylbenzoxazolium iodide (2.18 g., 1 mol.) and triethylamine (1.4 ml., 1 mol. +100%) were dissolved in ethanol (10 ml.) and the mixture heated under reflux for ten minutes. After chilling, the reaction mixture was diluted with chloroform (1000 ml.) and washed with several 100 ml. portions of water. After drying, the chloroform solution was chromatographed on a 12-inch column of neutral alumina 1 inch in diameter. After concentrating the desired fraction, the residue was twice recrystallized from benzene. The yield of purified dye was 1.1 g. (79%), M.P. 188–190° C. dec.

The novel alkoxycyclobutenones are useful not only as chemical intermediates but can also be used directly as plasticizers for synthetic resins. The following example illustrates the use as a plasticizer.

EXAMPLE 11

Fifteen parts of 2-butyl-3-ethoxy-2-ethyl-3-cyclobuten-1-one is milled on heated rolls with 85 parts of cellulose acetate butyrate resin to give a tough plasticized resin with improved molding properties.

From the foregoing it can be seen that the process of the invention provides a novel synthesis for producing novel 4-membered ring compounds including the alkoxycyclobutenones and the mixed ketene dimers. Recent discoveries have indicated marked physiological activity in a wide group of 4-membered ring compounds. Thus, the novel products of the invention are valuable reagents for pharmaceutical research and for the production of useful drugs.

The invention has been described in considerable detail with particular reference to certain preferred embodiments thereof, but it will be understood that variations and modifications can be effected within the spirit and scope of the invention as described hereinabove, and as defined in the appended claims.

I claim:
1. A cyclobutenone of the type,

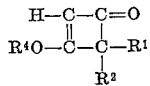

wherein $R^1$ and $R^2$ are from the group consisting of alkyl radicals of 1 to 8 carbon atoms and alkylene radicals which, with the carbon atom to which they are attached, form a saturated carbocyclic ring of 5 to 6 carbon atoms; and $R^4$ is a lower alkyl radical.

2. A cyclobutenone of the type,

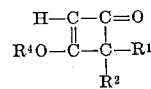

wherein $R^1$, $R^2$ and $R^4$ are lower alkyl radicals.

3. A ketene dimer having an enolic form of the type,

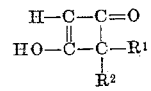

wherein $R^1$ and $R^2$ are lower alkyl radicals.

4. 3-ethoxy-4,4-dimethyl-2-cyclobuten-1-one.
5. 2-butyl-3-ethoxy-2-ethyl-3-cyclobuten-1-one.
6. The compound having the enolic form 3-hydroxy-4,4-dimethyl-2-cyclobutenone.

References Cited by the Examiner

Staudinger et al., "Berichte," vol. 53, p. 1100 (1920).
Staudinger et al., "Helv. Chim. Acta.," vol. 7, pp. 19–22 (1924).
Druey et al., "Helv. Chim. Acta.," vol. 45, A600 (1962).
Woodward et al., "J. Am. Chem. Soc.," vol. 72, p. 1303.
Morrison et al., "Organic Chemistry," pp. 417 and 418 (1959).
Nieuwenhuis et al., "Rec. Trav. Chim.," vol. 77, pp. 1153–69 (1958).
Wasserman et al., "Tetrahedron Letters," pp. 1031–4 (1962).

LEON ZITVER, *Primary Examiner.*

LORRAINE A. WEINBERGER, *Examiner.*

M. JACOB, *Assistant Examiner.*